United States Patent
Kawachi et al.

(10) Patent No.: US 7,063,897 B2
(45) Date of Patent: Jun. 20, 2006

(54) SLIDE MEMBER

(75) Inventors: Toshiaki Kawachi, Inuyama (JP);
Hideo Ishikawa, Inuyama (JP);
Masaaki Sakamoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 123 days.

(21) Appl. No.: 10/821,965

(22) Filed: Apr. 12, 2004

(65) Prior Publication Data
US 2004/0202887 A1 Oct. 14, 2004

(30) Foreign Application Priority Data
Apr. 10, 2003 (JP) .............................. 2003-106752

(51) Int. Cl.
*F16C 33/06* (2006.01)
*B32B 15/01* (2006.01)
(52) U.S. Cl. ........................ 428/642; 428/935; 384/912
(58) Field of Classification Search ..................... None
See application file for complete search history.

(56) References Cited

U.S. PATENT DOCUMENTS

| 6,309,759 B1 | 10/2001 | Tomikawa |
| 6,863,441 B1 * | 3/2005 | Kawachi et al. ............ 384/276 |
| 2003/0048961 A1 | 3/2003 | Kawachi |

FOREIGN PATENT DOCUMENTS

| GB | 2379449 A | 3/2003 |
| JP | 11050296 A | 3/1998 |
| JP | 2001-020955 | 1/2001 |

* cited by examiner

*Primary Examiner*—John J. Zimmerman
(74) *Attorney, Agent, or Firm*—Browdy and Neimark, PLLC

(57) ABSTRACT

A Bi base material of which a Miller index (202) face has the index of orientation of not less than 30% and in which the (202) face has the index of orientation assuming a maximum value as compared with those of other faces forms a minute structure and has a surface which is not a mirror finished surface but a fine, irregular surface on which minute and uniform projections in the form of a triangular pyramid or a quadrangular pyramid congregate. Therefore, the surface easily retains oil thereon to be improved thereby in oil wettability, as a result of which an improvement in anti-seizure is achieved.

8 Claims, 2 Drawing Sheets

SLIDE MEMBER

BACKGROUND OF THE INVENTION

The present invention relates to a slide member with an overlay layer provided on a slide alloy layer, and more particular, to a slide member comprising an overlay layer formed from Bi or Bi alloy.

In a plain bearing (slide member) used for a main shaft of a crankshaft, a large end of a connecting rod, and the like for internal combustion engines, a constitution is general, in which a Cu base or Al base bearing alloy (slide alloy) is lined on an inner peripheral surface of steel back metal and plating is used to cover a surface of the bearing alloy with an overlay layer through an intermediate layer or not.

As the overlay layer, Pb alloy has been mainly used heretofore and Sn alloy has been partly used. Since Pb is an environmental contamination substance, however, there is a tendency of avoiding its use, and JP-A-2001-20955 has proposed Bi or Bi alloy as its substitute material.

While Bi is a low melting point metal like Pb, it is harder than Pb and inferior thereto in lipophilic property, so that it is low in anti-seizure. An improvement in anti-seizure is earnestly requested in using Bi or Bi alloy for an overlay layer.

The invention has been thought of in view of the above situation, and has its object to provide a slide member which is excellent in anti-seizure.

BRIEF SUMMARY OF THE INVENTION

The inventors of the present application have fabricated various plain bearings with an overlay layer formed from Bi or Bi alloy and repeated characteristic tests thereon. As a result, the inventors have found a Bi base material as a Bi base material which is excellent in anti-seizure, separate from ones disclosed in JP-A-2001-20955 described above. Further, in measuring the crystal configuration of the Bi base material in terms of X-ray diffracted intensity, it has proved that one in which a Miller index (202) face has the index of orientation of not less than 30% and the X-ray diffracted intensity $R_{(202)}$ of the (202) face assumes a maximum value as compared with that of other faces is especially excellent in anti-seizure. The Bi base material has a surface of a minute structure as shown in FIG. 1, and the minute surface is not a mirror finished surface but a fine, irregular surface on which projections in the form of a triangular pyramid or a quadrangular pyramid congregate. Such fine, irregular surface easily retains oil thereon to be improved thereby in oil wettability, as a result of which an improvement in anti-seizure is thought to be achieved.

In view of the above, the invention provides a slide member comprising a back metal layer, a slide alloy layer provided on the back metal layer, and an overlay layer provided on the slide alloy layer, and wherein the overlay layer is formed from Bi or Bi alloy, and in a crystal configuration thereof, a Miller index (202) face has the index of orientation of not less than 30% and the X-ray diffracted intensity $R_{(202)}$ of the (202) face assumes a maximum value as compared with those of other faces.

Here, an explanation is given to the index of orientation. First, since Bi is composed of trigonal crystal, its Miller index is represented in three figures (h, k, l). Bi or Bi alloy in the invention shows an intermediate orientation between a complete random orientation as in fine powder and a particular one orientation as in single crystal, and a Miller index (202) face among respective crystal faces of Bi aligns in one direction at a high rate. A rate, at which such particular crystal face aligns in one direction, is denoted by an index of orientation.

An index of orientation Ae of a particular face is $$Ae = R_{(h,k,l)} \times 100 \div \Sigma R_{(h,k,l)}$$

where $R_{(h,k,l)}$ indicates the X-ray diffracted intensity of respective faces of a crystal of Bi or its alloy in an overlay layer.

However, $R_{(h,k,l)}$ of a numerator in the above formula indicates the X-ray diffracted intensity of a face of which an index of orientation is to be found, and $\Sigma R_{(h,k,l)}$ indicates the sum total of the X-ray diffracted intensities of respective faces.

In the invention, the Miller index (202) face can have the index of orientation of not less than 40% and the X-ray diffracted intensity $R_{(012)}$ of a Miller index (012) face can be made not more than 45% of the X-ray diffracted intensity $R_{(202)}$ of the (202) face.

The above constitution makes it possible to obtain a further excellent anti-seizure.

According to the invention, the overlay layer can have a thickness of 3 to 15 μm. When the thickness is less than 3 μm, the overlay layer cannot realize its function, and when the thickness exceeds 15 μm, the overlay layer is reduced in fatigue resistance.

Also, according to the invention, an intermediate layer formed from one or more selected from Ni, Cu, Ag, Co, Ni alloy, Cu alloy, Ag alloy, or Co alloy can be provided between the slide alloy layer and the overlay layer. Thereby, the overlay layer can be enhanced in bond strength to the slide alloy layer.

DETAILED DESCRIPTION OF THE PREFERRED EMBODIMENT

Figure 1:
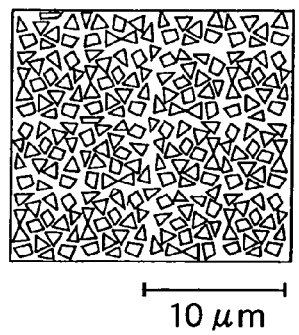
FIG. 1 is a schematic view showing a microphotograph of a surface of an overlay layer of a product sample of the invention.

An embodiment of the invention will be described hereinunder.

A slide member according to the invention is formed by lining a Cu base or Al base slide alloy on a surface of a back metal layer and covering the slide alloy with an overlay layer composed of Bi or Bi alloy through an intermediate layer or not. The slide member can be made a plain bearing used for a main shaft of a crankshaft, a large end of a connecting rod, and the like for internal combustion engines.

The following electroplating condition was employed to perform plating of the overlay layer by means of electroplating.

Bath composition: bismuth oxide; 10 to 70 g/l, methanesulfonic acid; 30 to 150 ml/l, HS-220S (trade mark; manufactured by EBARA-UDYLITE CO. LTD.,); 20 to 60 ml/l Bath temperature: 25 to 40° C.

Current density: 1 to 6 A/dm$^2$

In order to obtain an index of orientation of at least 40% for a Miller index (202) face, the PR electrolytic method (Period Reverse Electroplating) is effective. The PR electrolytic method is one in which cathode current is periodically switched over to anode current, and switching is commonly performed with time of anode current being 10 to 20% of time of cathode current. The longer time of anode current, the smoother a plated surface, but the slower a speed of plating. The index of orientation can be changed by regulating anode current, cathode current, and a switching cycle thereof.

Using the plating method, product samples 1 to 8 of the invention and product samples 1 to 4 of comparative examples shown in the following TABLE 1 were obtained. An oil wettability test and a anti-seizure test were carried out on the product samples 1 to 8 of the invention and the product samples 1 to 4 of comparative examples.

In the oil wettability test, oil of 0.02 g corresponding to SAE 20 was dropped on overlay layers of the product samples 1 to 8 of the invention and the product samples 1 to 4 of comparative examples in the form of a flat plate and spread (area) of the oil after two minutes was evaluated. The evaluation was performed on the basis of a rank A for an oil spread area of not less than 350 mm$^2$, a rank B for an oil spread area of not less than 300 mm$^2$, and a rank C for an oil spread area of less than 300 mm$^2$.

Further, the anti-seizure test was carried out in conditions indicated in the following TABLE 2.

TABLE 2

| CONDITIONS OF SEIZURE TEST | |
| --- | --- |
| TESTER | SEIZURE TESTER |
| SPEED OF ROTATION | 7200 rpm |
| PERIPHERAL SPEED | 20 m/s |
| TEST LOAD | INCREASED BY 10 MPa EVERY 10 MINUTES |
| OILING TEMPERATURE | 100° C. |
| OILING QUANTITY | 150 ml/min |
| LUBRICATING OIL | VG22 |
| SHAFT BEING TESTED | JIS S55C |

The evaluation was performed in such a manner that when a back surface temperature of a sample exceeded 200° C., or a shaft-driving belt for rotating a mating shaft slipped due to fluctuation in torque, seizure was judged and a maximum surface pressure was defined by a value obtained by dividing a test load immediately before judgment of such seizure by a pressure receiving area.

TABLE 1

| SAMPLE NO. | COMPOSITION (MASS %) OF OVERLAY LAYER | | INDEX OF ORIENTATION (%) | | INTENSITY RATIO (012)/(202) | SLIDE ALLOY | INTER-MEDIATE LAYER | THICKNESS (μm) OF OVERLAY LAYER | RANK OF OIL WETTABILITY | MAXIMUM SURFACE PRESSURE (MPa) WITHOUT SEIZURE |
| --- | --- | --- | --- | --- | --- | --- | --- | --- | --- | --- |
| | Bi | Cu | (012) | (202) | | | | | | |
| PRODUCTS OF THE INVENTION | | | | | | | | | | |
| 1 | 100 | — | 4.5 | 69 | 0.065 | Cu ALLOY | NONE | 10 | A | 80 |
| 2 | 100 | — | 14.3 | 52 | 0.275 | Cu ALLOY | NONE | 10 | B | 80 |
| 3 | 100 | — | 8.5 | 49.5 | 0.172 | Cu ALLOY | NONE | 5 | B | 80 |
| 4 | 100 | — | 5.6 | 60.6 | 0.092 | Cu ALLOY | Ag | 15 | A | 85 |
| 5 | 100 | — | 5.3 | 61.6 | 0.086 | Al ALLOY | Cu | 10 | A | 75 |
| 6 | 98 | 2 | 15.5 | 41 | 0.378 | Cu ALLOY | Ni | 5 | B | 75 |
| 7 | 98 | 2 | 13.6 | 31 | 0.439 | Cu ALLOY | NONE | 5 | B | 70 |
| 8 | 98 | 2 | 15.9 | 30 | 0.53 | Cu ALLOY | NONE | 10 | B | 70 |
| PRODUCTS OF COMPARATIVE EXAMPLES | | | | | | | | | | |
| 1 | 100 | — | 95 | 0.3 | 317 | Cu ALLOY | Ni | 10 | C | 60 |
| 2 | 98 | 2 | 40 | 7.1 | 5.6 | Cu ALLOY | NONE | 5 | C | 60 |
| 3 | 98 | 2 | 41.6 | 6 | 6.9 | Cu ALLOY | NONE | 10 | C | 60 |
| 4 | 100 | — | 8.1 | 28.8 | 0.281 | Al ALLOY | Cu | 10 | C | 55 |

Results of the above oil wettability test and anti-seizure test are described in TABLE 1.

As seen from TABLE 1, it has been confirmed that with respect to oil wettability, all the product samples 1 to 8 of the invention belong to the rank A or the rank B while all the product samples 1 to 4 of comparative examples belong to the rank C, and that the product samples 1 to 8 of the invention are superior to the latter in oil wettability. Further, as the result of the favorable oil wettability, the product samples 1 to 8 of the invention are large in maximum surface pressure without seizure to be excellent in anti-seizure as compared with the product samples 1 to 4 of comparative examples.

Figure 3:
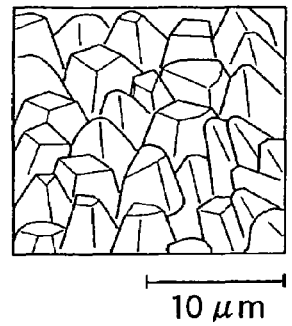
FIG. 3 is a schematic view showing a microphotograph of a surface of an overlay layer of a product sample of comparative examples.

FIG. 1 is a view schematically showing a microphotograph of a surface of an overlay layer of the product sample 2 of the invention, and FIG. 3 is a view schematically showing a microphotograph of a surface of an overlay layer of the product sample 2 of comparative examples. As understood from comparison between FIG. 1 and FIG. 3, the product sample 2 of the invention has that surface of an overlay layer on which minute and uniform projections congregate to define a fine, irregular surface. Although being not seen in FIG. 1, the projections assume a shape close to that of a triangular pyramid and a quadrangular pyramid.

In contrast, the product sample 2 of comparative examples has that surface of an overlay layer which is a coarse surface composed of relatively large irregularities being uneven in size. While it is generally said that a surface on which small irregularities are minutely present is excellent in oil wettability, the product sample 2 of the invention has a surface of an overlay layer which is exactly in the form of a minute, irregular surface said to be excellent in oil wettability, and it has been confirmed that the surface of the overlay layer is excellent in oil wettability owing to its surface configuration.

Figure 2:
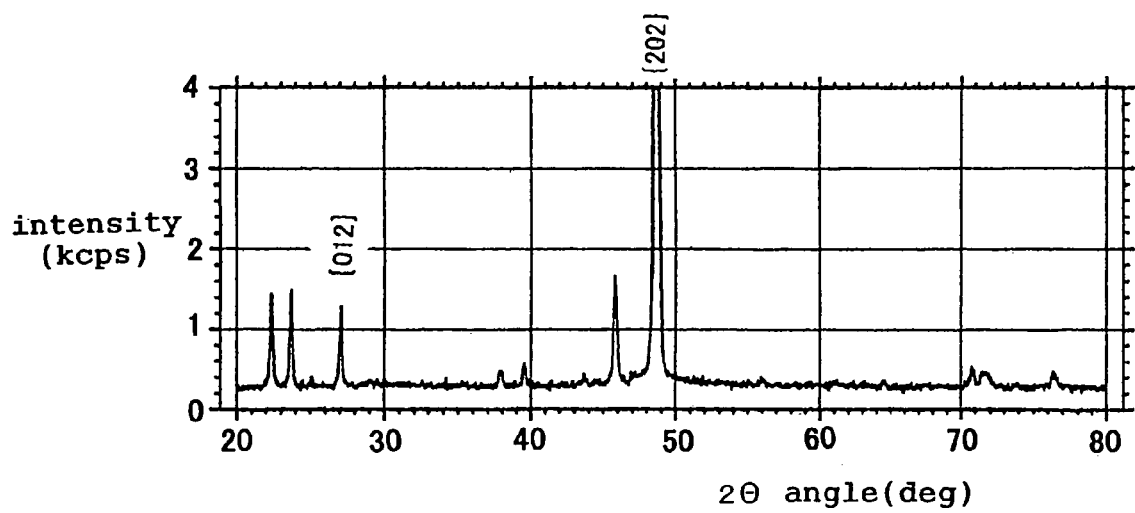
FIG. 2 is a view showing a X-ray diffraction pattern of the surface of the overlay layer of a product sample of the invention.
Figure 4:
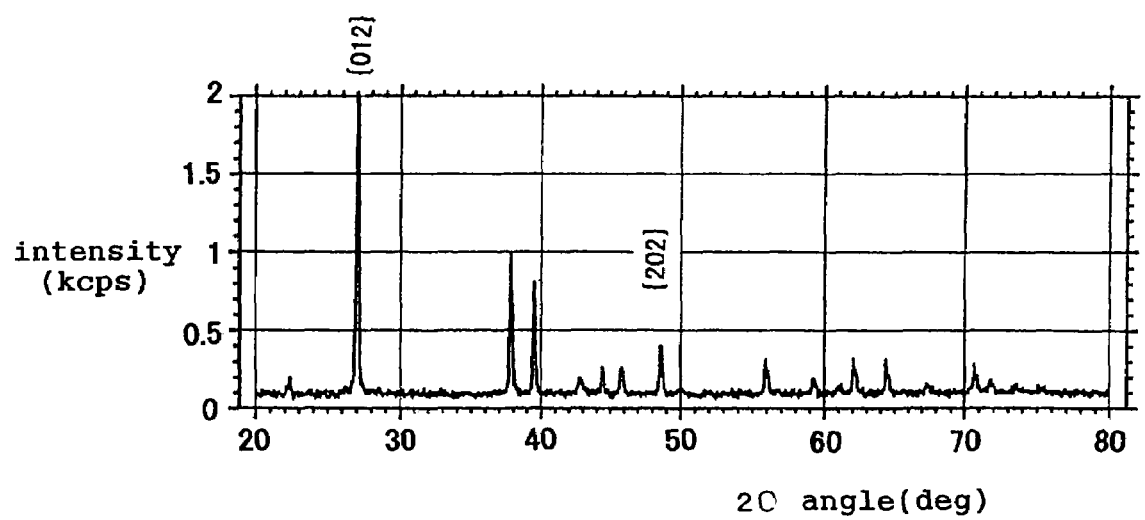
FIG. 4 is a view showing a X-ray diffraction pattern of the surface of the overlay layer of a product sample of comparative examples.

A test for taking a X-ray diffraction figure of the structure of an overlay layer was carried out on the product samples 1 to 8 of the invention and the product samples 1 to 4 of comparative examples, which had the surface configurations, respectively. FIG. 2 shows a X-ray diffraction pattern of the overlay layer of the product sample 2 of the invention, and FIG. 4 shows a X-ray diffraction pattern of the overlay layer of the product sample 2 of comparative examples. As apparent from FIGS. 2 and 4, a Miller index (202) face of the product sample 2 of the invention is especially higher in X-ray diffracted intensity than other faces while a Miller index (012) face of the product sample 2 of comparative examples is especially higher in X-ray diffracted intensity than other faces and a Miller index (202) face thereof is low in X-ray diffracted intensity. The tendency of X-ray diffracted intensity for the Miller index (202) face and the Miller index (012) face, as described with respect to the product sample 2 of the invention and the product sample 2 of comparative examples is the same as that for the product samples 1, 3 to 8 of the invention and the product samples 1, 3, 4 of comparative examples.

Indices of orientation of a Miller index (202) face and a Miller index (012) face, and intensity ratios of the both faces were calculated for the product samples 1 to 8 of the invention and the product samples 1 to 4 of comparative examples, results of which are indicated in TABLE 1.

According to the results, with all the product samples 1 to 8 of the invention which are excellent in anti-seizure, the index of orientation of a Miller index (202) face is not less than 30% and the X-ray diffracted intensity of the (202) face assumes a maximum value as compared with the X-ray diffracted intensities of other faces, while the index of orientation of a Miller index (202) face in all the product samples 1 to 4 of comparative examples is less than 30%.

From the above, it can be said that Bi or Bi alloy in which the index of orientation of a Miller index (202) face is not less than 30% and the X-ray diffracted intensity of the (202) face assumes a maximum value as compared with those of other faces forms a structure which is excellent in anti-seizure.

Further, for the product samples 1 to 6 of the invention, the index of orientation of a Miller index (202) face is not less than 40% and the X-ray diffracted intensity $R_{(012)}$ of a Miller index (012) face is not more than 45% of the X-ray diffracted intensity $R_{(202)}$ of the Miller index (202) face, so the product samples 1 to 6 of the invention are more excellent in anti-seizure than the product samples 7 and 8 of the invention which do not meet with the above conditions.

In addition, the invention is not limited to the embodiment described above and shown in the drawings, but can be extended or modified in the following manner.

The plating method for formation of the overlay layer is not limited to that described above.

The overlay layer is not limited to ones formed by means of plating.

Metal making an alloy with Bi is not limited to Cu.

In order to achieve improvement in characteristics, the overlay layer may contain hard substances and other substances.

The slide member is not limited to the use for plain bearings.

What is claimed is:

1. A slide member comprising a back metal layer, a slide alloy layer provided on the back metal layer, and an overlay layer provided on the slide alloy layer, and
    wherein the overlay layer is formed from Bi or Bi alloy, and in a crystal configuration thereof, a Miller index (202) face has the index of orientation of not less than 30% and the X-ray diffracted intensity $R_{(202)}$ of the (202) face assumes a maximum value as compared with those of other faces.

2. The slide member according to claim 1, wherein the Miller index (202) face has the index of orientation of not less than 40% and the X-ray diffracted intensity $R_{(012)}$ of a Miller index (012) face is not more than 45% of the X-ray diffracted intensity $R_{(202)}$ of the (202) face.

3. The slide member according to claim 1, wherein the overlay layer has a thickness of 3 to 15 μm.

4. The slide member according to claim 2, wherein the overlay layer has a thickness of 3 to 15 μm.

5. The slide member according to claim 1, wherein an intermediate layer formed from one or more selected from Ni, Cu, Ag, Co, Ni alloy, Cu alloy, Ag alloy, or Co alloy is provided between the slide alloy layer and the overlay layer.

6. The slide member according to claim 2, wherein an intermediate layer formed from one or more selected from Ni, Cu, Ag, Co, Ni alloy, Cu alloy, Ag alloy, or Co alloy is provided between the slide alloy layer and the overlay layer.

7. The slide member according to claim 3, wherein an intermediate layer formed from one or more selected from Ni, Cu, Ag, Co, Ni alloy, Cu alloy, Ag alloy, or Co alloy is provided between the slide alloy layer and the overlay layer.

8. The slide member according to claim 4, wherein an intermediate layer formed from one or more selected from Ni, Cu, Ag, Co, Ni alloy, Cu alloy, Ag alloy, or Co alloy is provided between the slide alloy layer and the overlay layer.

* * * * *